Feb. 21, 1928.

D. W. HAYNES

POULTRY ROOST

Filed March 25, 1927

1,660,265

D. W. Haynes
INVENTOR

BY *Victor J. Evans*
ATTORNEY

WITNESS:

Patented Feb. 21, 1928.

1,660,265

UNITED STATES PATENT OFFICE.

DAVID W. HAYNES, OF GREAT BEND, KANSAS, ASSIGNOR OF ONE-HALF TO MARTIN L. CROW, OF GREAT BEND, KANSAS.

POULTRY ROOST.

Application filed March 25, 1927. Serial No. 178,396.

This invention relates to perches or roosts for birds and fowls and which embodies among other characteristics means for exterminating vermin.

An object of the invention comprehends receptacles in the perches to contain a suitable insecticide.

Another object of the invention contemplates tops for the receptacles disposed in spaced relation to permit fumes from the insecticide to pass therebetween for effective use.

More specifically stated the tops and space therebetween are covered to prevent accumulation of extraneous matter within the receptacles.

With the above and other objects in view, the invention further consists of the following novel features and details of construction to be hereinafter more fully described, illustrated in the accompanying drawing, and pointed out in the appended claims.

In the drawings:—

Figure 1:
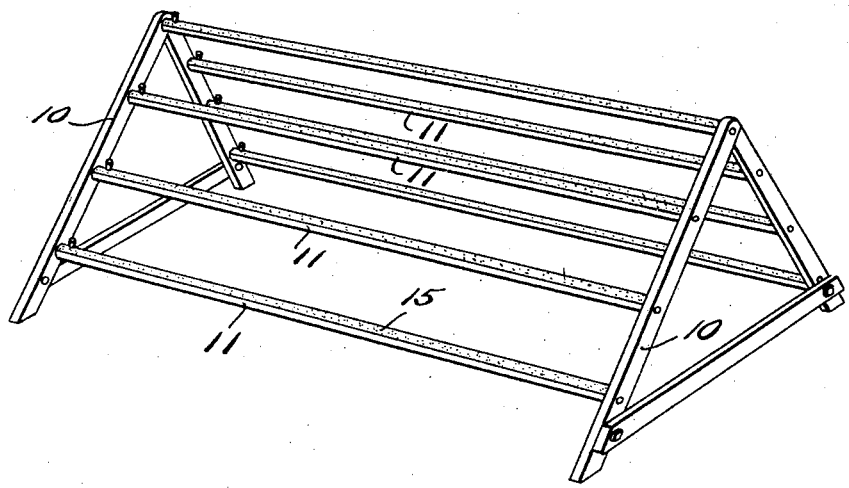
Figure 1 is a perspective view of the invention.
Figure 2:
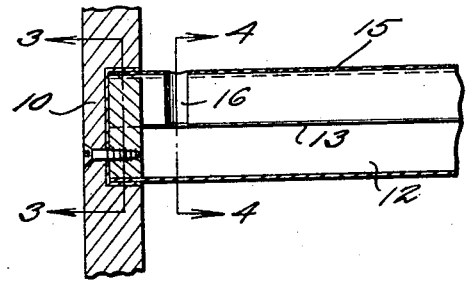
Figure 2 is a fragmentary longitudinal sectional view taken through a perch.
Figure 4:
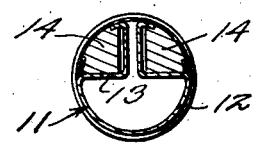
Figure 4 is a sectional view taken on line 4—4 of Figure 2.
Figure 5:
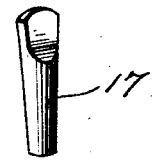
Figure 5 is a perspective of a bung or dowel utilized for closing an inlet opening in the receptacle portions of the perches.
Figure 3:
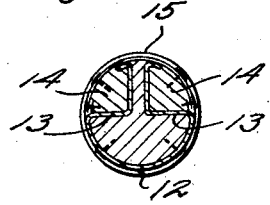
Figure 3 is a sectional view taken on line 3—3 of Figure 2.

Referring to the drawing in detail, wherein like characters of reference denote corresponding parts, the reference characters 10 indicate frame structures between which perches or roosts indicated generally at 11 are supported. The perches are preferably constructed of non-corrosive and rust proof material and bent into the configuration of elongated semi-circular troughs 12. The side edges of the troughs are provided with offset extensions 13 which extend inwardly and upwardly from the side edges, substantially as illustrated in Figures 3 and 4 of the drawing. Elongated triangular strips 14 provided with arcuate-shaped outer sides are supported upon the offset extensions 13 in order to preserve the cylindrical shape of the perch. The upstanding portions of the offset extensions 13 are disposed in slight spaced relation, the purpose of which will be presently apparent. The ends of the troughs and strips 14 are suitably secured within the frames 10 substantially as illustrated in Figure 2 of the drawing. A covering 15 is extended over the strips 14 and spaces therebetween to prevent accumulation of extraneous matter within the receptacle or trough 12. An enlarged opening 16 is drilled in the walls of the upstanding portions of the offset extensions and a dowel pin or bung 17 inserted to close the same when desired. Said opening is utilized to fill the receptacle or trough 12 with a suitable insecticide.

In the use and operation of the invention the perches are disposed in elevated positions within a yard or run or within a house for the particular bird or fowl. The receptacles or troughs when filled with a suitable insecticide will throw off fumes which will pass upward between the upstanding portions of the reduced extensions 13 through the cloth or covering 15 beneath the particular bird or fowl. Said fumes will be smothered within the plumage of the fowl and the vermin exterminated. The application of the invention will obviate the necessity of spraying and dusting insecticides and also whitewashing.

The invention is susceptible of various changes in its form, proportions and minor details of construction and the right is herein reserved to make such changes as properly fall within the scope of the appended claims.

Having thus described the invention, what I claim is:—

1. A roost comprising a semi-circular and elongated trough, offset extensions inwardly directed from the side edges of the trough being provided with upstanding portions disposed in spaced relation, strips supported upon the extensions and of a configuration to preserve the cylindrical characteristics of the perch, and a covering extended over the strips and spaces between the upstanding portions of the extensions to prevent accumulation of extraneous matter within the receptacle but permitting fumes to pass upwardly therethrough.

2. A roost comprising a semi-circular and elongated trough, extensions inwardly offset from the side edges of the trough being provided with spaced upstanding portions, semi-circular strips carried upon the extensions and abutting the upstanding portions and adapted to preserve the cylindrical characteristics of the roost, the extremities of the upstanding portions being bent upon themselves and extended over the upper portions of the strips, and a covering extended over the strips and upstanding portions of the extensions to prevent accumulation of extraneous matter within the trough.

In testimony whereof I affix my signature.

DAVID W. HAYNES.